Patented Dec. 21, 1926.

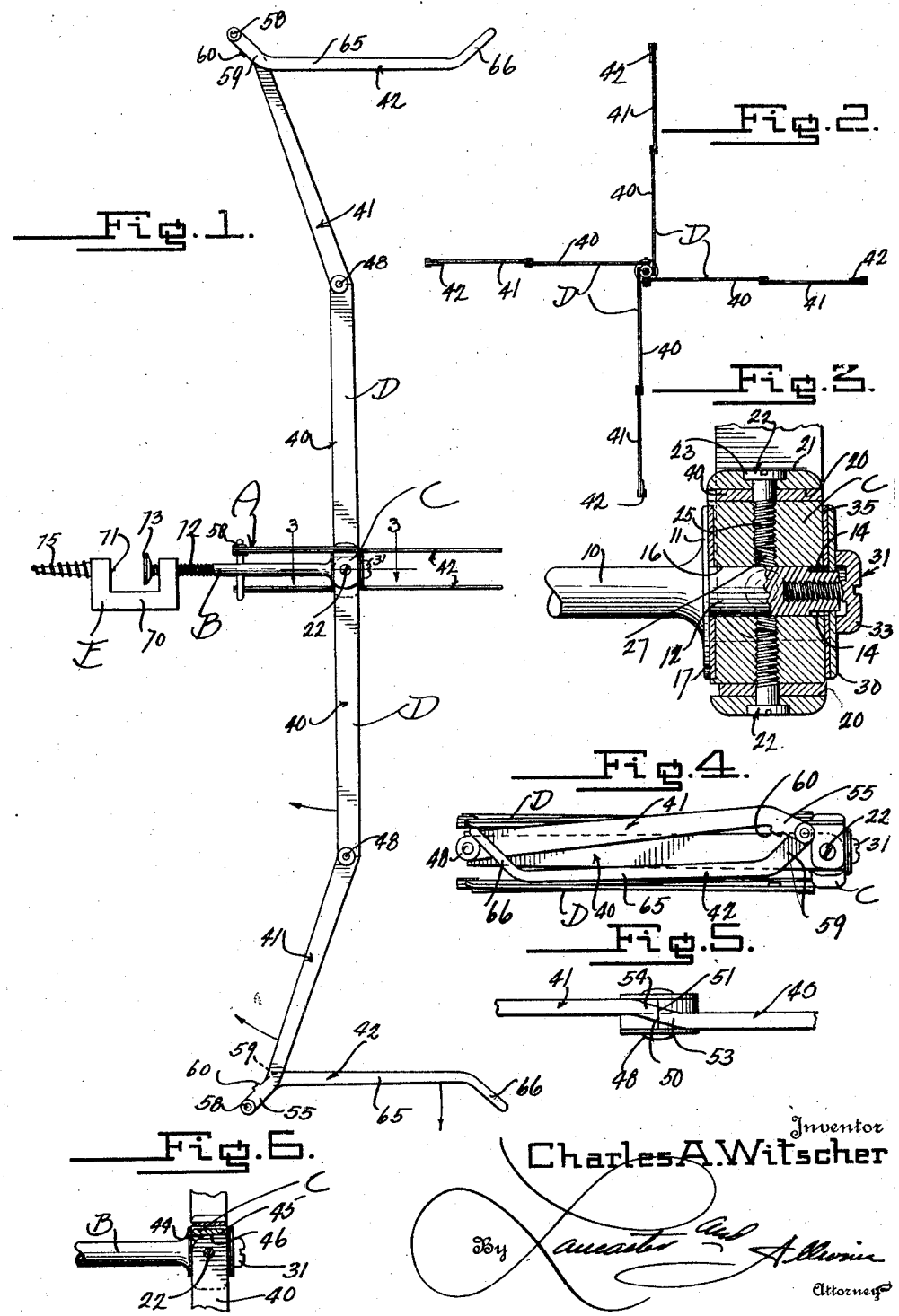

1,611,625

UNITED STATES PATENT OFFICE.

CHARLES A. WITSCHER, OF BROOKLYN, NEW YORK.

LINE-DRYING REEL.

Application filed November 3, 1924. Serial No. 747,586.

This invention relates to an improved reel primarily adapted for receiving wet or moist fishing lines in order to enable the same to dry.

The primary object of the invention is the provision of a line drying reel of the type mentioned, which embodies a plurality of connected and collapsible parts which do not have to be detached in order to collapse the same into a compact relation.

An important object of the invention is the provision of a fishing line drying reel embodying a spindle portion with a plurality of collapsible arms rotatably supported thereby in such manner that they may be readily extended and securely positioned for holding a fishing line, or collapsed into connected relation.

An important object of the invention is the provision of a reel of the above mention character which when extended and supporting a fishing line will be rigidly held in a stable assembled relation incident to the positioning of the parts thereof and incident to the force occasioned by the winding of the line thereon.

A further object of the invention is the provision of a line drying reel embodying a line receiving reel with line receiving portions thereon positioned to provide an annular line of revolution of approximately 24 inches in diameter, which may be compactly folded, easily extended, and which embodies a plurality of parts which may be economically assembled.

Other objects and advantages of this invention will be apparent during the course of the following detailed description.

In the accompanying drawing, forming a part of this specification, and wherein similar reference characters designate corresponding parts throughout the several views, Figure 1 is a side elevation of the improved line drying reel in its extended relation.

Figure 2 is a front elevation of the improved reel.

Figure 3 is an enlarged fragmentary cross sectional view taken substantially on the line 3—3 of Figure 1, and showing merely the hub and spindle construction of the reel.

Figure 4 is a view showing the relation in which the parts of the improved reel may be compactly collapsed in a connected relation.

Figure 5 is an enlarged fragmentary view of a joint used for pivotally connecting sections of each arm of the reel.

Figure 6 is a fragmentary sectional view showing more particularly the means of connecting each arm of the reel to a hub structure.

In the drawing, wherein for the purpose of illustration is shown only a preferred embodiment of this invention, the letter A may generally designate the reel, which may include the supporting rod and spindle member B; hub C; arms D collapsibly connected to the hub C; and conventional attaching means E for securing the rod member B in the desired position to any object.

The rod B includes the body portion 10, which at an end thereof is provided with an annular outstanding flange 11 having a reduced spindle 12 extending axially from the body portion 10 at the opposite side of the flange 11; this spindle 12 being flattened as at 14, adjacent the outer end thereof, at diametrically opposed sides thereof.

The hub C is preferably of cylindrical formation, provided with a passageway 16 therethrough adapted to receive the spindle 12, in order to rotatably bear on said spindle 12. Inwardly of the side of the hub C facing the flange 11 a recess is provided adapted to receive a bearing washer 17 which engages against the flange 11. This hub C is of novel construction, and is preferably provided with a series, preferably four, of slots 20 tangentially arranged inwardly from the outer circumference 21 of said hub. Pivot clamping screws 22 are preferably provided, one of each of the same intersecting each of the slots 20, with the kerfed head 23 thereof countersunk in the outer periphery of the hub C, and the screw threaded shank portion 25 threadedly extending through radial screw threaded sockets 27 provided in the hub through the slots 20 thereof, radially of the axis of said hub. These screws or members 22 are provided for the purpose of pivoting the arms D to the hub C, as will be subsequently set forth. In order to retain the hub C in rotatable relation on the spindle 12, a washer 30 is employed, which is keyed to the spindle 12, and clamped toward the hub C by means of a clamping screw 31, which has a screw threaded shank engaging in a screw threaded socket disposed inwardly from the outer end of the spindle 12, and also including a head 33 lying against said washer 30 so that the same may urge a friction washer 35 into engagement against the hub C, as is illustrated in Figure 3 of the drawing. The screw 31 is of the type which may adjust the frictional binding relation of the hub C for rotation on the spindle 12, just so the same may rotate thereon as freely as desired, without vibration.

The rods D are of novel construction, each of the same including a hub pivoted section 40; intermediate section 41; and line receiving section 42. Each hub pivoted section 40 has the hub adjacent end thereof inserted into a tangential slot 20 of the hub C, pivoted therein by means of the bearing portion of one of the clamping pivot screws 22. Each section 40 has the edge thereof facing the hub C rounded at a corner 44, to permit the pivotal movement of the section 40 toward or away from the rod B. In its extended movement the section 40 is preferably at right angles to the rod B, and in this position the straight edge 45 thereof engages against the inside end 46 of the slot 20 of the hub C, to limit the outward amplitude of movement of the section 40 when fully extended.

Each intermediate section 41 is pivotally connected, at 48 to the outer end of a section 40, by means of a riveted friction pivot joint. In extended relation with respect to the section 40 the section 41 is positioned at an obtuse angle, and in such relation that it may be collapsed toward the rod of supporting member B, in the direction indicated by the arrows in Figure 1 of the drawing. In the most extended relation of the sections 40 and 41, edge surfaces 50 and 51 respectively, adjacent the joint 48, engage each other to limit the extended amplitude of movement of said sections. To permit such abutment the sections 40 and 41 are offset, as at 53 and 54 respectively, laterally of the pivot construction 48, as is illustrated in Figures 1 and 5 of the drawing. At its outer end the intermediate section 41 is offset, as at 55 toward the side thereof which faces the supporting rod B, and at the outer end of the offset portion 55 the line receiving section 42 is pivoted, as by a friction pivot construction 58.

Each section 42 is swingable through an arc of over 270° with respect to its section 41, and it includes an offset end 59 pivoted by the friction pivot construction 58 above mentioned, to the section 41. The offset end 55 of the intermediate section 41 is provided with a stop lug 60 against which the offset end 59 of the section 42 abuts in extended relation to limit the open amplitude of movement of the section 42 with respect to its other sections of each arm. Each section 42 really includes the intermediate straight length 65; the offset end portion 59 above mentioned, and the outer offset end portion 66, providing a U-shaped structure which when in extended relation with respect to the other sections of each arm is disposed at right angles to the plane of rotation of the reel.

The means E consists of the U-shaped clamping frame 70, providing a recess 71 therein. The end 72 of the rod B is screw threaded in the frame, so that a clamping head 73 extends into the recess 71 whereby the same may clamp the reel to a wall or the like. If desired, a screw threaded shank 75 may be carried by the frame 70, as a means of facilitating attachment of the improved reel A to a wall or the like.

The operation of the improved reel from the foregoing description will be apparent. When in its extended relation the reel is as is illustrated in Figure 1 of the drawing, and it can readily be understood that the line will be reeled into the pockets provided by the sections 42 of the reel arms D. The force produced by drawing of the line taut in its circumferential winding on the reel will all the more tend to hold the sections in their rigid extended relation. It is to be noted that the arm sections 42 do not extend entirely transversely to one side of the length of the arm D, but due to the obtuse positioning of the intermediate section 41, the outer sections 42 when positioned for receiving the line are extended across the plane of rotation produced by the sections 40.

From the foregoing description of this invention it is apparent that a novel type of reel has been provided which will facilitate the drying of fishing lines after use. The device may be readily manufactured and is easily extended, and may be collapsed into the compact relation illustrated in Figure 4. To effect such collapsing it is not necessary to detach any of the parts, of the reel A, as they are all assembled, and held by frictional pivoted joints as above described.

Various changes in the shape, size, and arrangement of parts may be made to the form of the invention herein shown and described, without departing from the spirit of this invention or the scope of the claims.

I claim:

1. As an article of manufacture a reel comprising a hub portion having slots extending thereinto from the outer periphery thereof nonradial to the axis of the hub, and arms pivotally connected in each of said slots so that they may extend outwardly of said hub substantially at right angles to the axis of the hub or collapsed substantially axially therewith.

2. In a reel the combination of a revoluble hub having slots nonradial therein with respect to its axis of rotation, arms extending into said slots, radial pins carried by said hub transversely intersecting said slots to pivotally connect the arms to said hub, and means supporting the hub for rotation.

3. In a reel of the class described the combination of a hub, and arms pivotally connected with the hub each including a hub pivoted section which may be collapsed longitudinally of the axis of the hub or extended laterally substantially at right angles to said axis, an intermediate section for each arm pivotally connected to the first mentioned section of each arm by a friction pivot which supports said sections against collapsing, said intermediate section being collapsible in parallelism with the first mentioned section and when extended being arranged at an obtuse angle thereto, said intermediate section of each arm at the outer end thereof being laterally offset in the direction of pivotal movement of the intermediate section with respect to collapsing the same on the first mentioned section, and a line receiving section for each arm pivotally connected at the outer end of each offset of the intermediate sections so that the line receiving sections may be collapsed in direction toward the collapsible movement of the other sections into substantially parallelism with the first and second mentioned sections of each arm, said line receiving section being of U-shaped formation and being limited in its movement with respect to the intermediate section whereby to be transversely arranged with respect to the plane of revolution of the reel when supported for line receiving purposes.

4. In a collapsible reel the combination of a hub having slots inwardly of the periphery thereof, arms, and pivot pins adjustable in said hub transversely thru said slots, including portions on which the arms pivot and having heads adapted to engage the hub to transversely contract said slots and clamp the respective arms to the hub in a desired position against movement.

5. In a reel the combination of a hub, means revolubly supporting the hub, said hub inwardly of the outer periphery thereof having a series of nonradial slots, said hub transversely thru said slots having openings extending to the outer periphery of the hub and threaded adjacent the axis of the hub, arms having openings therein, said arms adapted to extend into the slots of the hub so that the openings thereof align with the respective adjacent openings across said slots of the hub, and screw members including shanks adjustably connected in said openings of the hub and the arms to pivotally connect the latter in pivoted relation on said hub, said screws upon adjustment inwardly toward the axis of the hub being adapted to clamp the arms in a secured rigid relation on said hub.

6. In a reel the combination of a hub, and a plurality of collapsible arms collapsibly connected with the hub each including a section directly connected with the hub, an intermediate section connected with the first mentioned section at its outer end so that the intermediate section may be arranged into an obtuse angular position with respect to the first mentioned section extended, and a line receiving outer section collapsibly connected with the intermediate section and adapted to be extended to one side of the intermediate section so that the same substantially midway between its ends is intersected by the extended axis of the hub connected section.

7. In a reel the combination of a hub, and arms pivotally connected with the hub each including a hub pivoted section, and a second section pivoted at the outer end of the hub pivoted section, said hub pivoted sections together with their respective second sections each being laterally offset adjacent their pivot connections for abutment when they are opened to limit the open amplitude of movement of the hub sections with respect to their respective second sections.

CHARLES A. WITSCHER.